United States Patent [19]
Hoffman

[11] Patent Number: 5,617,154
[45] Date of Patent: Apr. 1, 1997

[54] LIGHT FILTERING CONTACT LENS

[75] Inventor: William C. Hoffman, Lakewood, Colo.

[73] Assignee: Flexlens, Englewood, Colo.

[21] Appl. No.: 331,328

[22] Filed: Oct. 28, 1994

[51] Int. Cl.$^6$ ..................................................... G02C 7/04
[52] U.S. Cl. ................. 351/162; 351/160 R; 351/160 H
[58] Field of Search ............................. 351/162, 160 R, 351/161, 160 H

[56] References Cited

U.S. PATENT DOCUMENTS

| | | | |
|---|---|---|---|
| 3,382,183 | 5/1968 | Donoian et al. | 252/300 |
| 3,586,423 | 6/1971 | Zeltzer | 351/39 |
| 3,701,590 | 10/1972 | Zeltzer | 351/39 |
| 4,239,712 | 12/1980 | Neefe | 351/161 |
| 4,252,421 | 2/1981 | Foley, Jr. | 351/162 |
| 4,304,895 | 12/1981 | Loshaek | 351/160 H |
| 4,324,461 | 4/1982 | Salvatori | 351/160 H |
| 4,390,676 | 6/1983 | Loshaek | 351/160 H |
| 4,468,229 | 8/1984 | Su | 351/162 |
| 4,528,311 | 7/1985 | Beard et al. | 351/160 H |
| 4,553,975 | 11/1985 | Su | 351/162 |
| 4,620,851 | 11/1986 | Ryder et al. | 351/162 |
| 4,698,374 | 10/1987 | Gallas | 523/106 |
| 4,702,574 | 10/1987 | Bawa | 351/162 |
| 4,719,248 | 1/1988 | Bambury et al. | 351/163 |
| 4,733,959 | 3/1988 | Claussen et al. | 351/162 |
| 4,753,654 | 6/1988 | Posin et al. | 351/162 |
| 4,952,046 | 8/1990 | Stephens et al. | 351/162 |
| 4,998,817 | 3/1991 | Zeltzer | 351/162 |
| 5,062,701 | 11/1991 | Drazba et al. | 351/162 |
| 5,080,688 | 1/1992 | Cohen | 351/165 |
| 5,141,301 | 8/1992 | Morstad | 351/161 |
| 5,187,207 | 2/1993 | Gailas | 351/161 |
| 5,235,358 | 8/1993 | Mutzhas et al. | 351/163 |
| 5,252,628 | 10/1993 | Chirila et al. | 351/160 H |

OTHER PUBLICATIONS

Dean, Carl L., "A Breakthrough In Bifocal Contact Lenses?" *The Journal of the Texas Optometric Association*, Feb., 1969.
*Encyclopedia of Contact Lens Practice*, Mar., 1961, pp. 2–9.

*Primary Examiner*—Scott J. Sugarman
*Assistant Examiner*—Jordan M. Schwartz
*Attorney, Agent, or Firm*—Oldham & Oldham Co., LPA

[57] ABSTRACT

The invention relates to a light-absorbing contact lens and process for preparing same. A contact lens is tinted with colorants which provide desired spectral transmittance characteristics over the tinted portion of the lens. The contact lens provides transmittance of incident radiation having a wavelength from 500 to 700 nm which is variable and wavelength-dependent. The lens of this invention also preferably filters out ultraviolet and blue light (wavelengths from 200 to about 500 nm). Various transmittance patterns for wavelengths from 500 to 700 nm are obtainable by appropriate choice of colorant combinations; the transmittance curve in this region and the colorants to achieve the desired transmittance characteristics are chosen to fill particular needs of a wearer as for example limiting transmittance of visible light in high intensity light environments. Lenses according to the invention may provide unique benefits for use with particular applications such as sporting activities, recreational activities, or the like. Both hard and soft contact lenses are disclosed, and various examples of specialized lenses for particular applications are disclosed.

28 Claims, 6 Drawing Sheets

000
LIGHT FILTERING CONTACT LENS

TECHNICAL FIELD

This invention relates to tinted contact lenses and more particularly to a contact lens, at least a portion of which is tinted by the addition of two or more colorants such that the lens or tinted portion thereof absorb substantially all wavelengths of incident radiation in the range up to 500 nanometers and has a preselected light transmittance curve in the wavelength range from 500 to 800 nanometers.

BACKGROUND ART

Harmful effects to the eye from ultraviolet radiation (from about 100 nm to about 380–400 nm in wavelength) have long been known. Ultraviolet radiation has been linked to cornea, lens, and retinal damage, including macular degeneration, and is believed to be a major cause of yellow-cataracts.

More recently, the undesirable effects of high transmittance levels of blue light (wavelengths from about 380–400 nm to about 500–515 nm) have received attention. High levels of blue light radiation have also been linked to retinal damage, macular degeneration, retinitis pigmentosa, and night blindness. In addition, blue light tends to be scattered in the atmosphere, especially in haze, fog, rain, and snow, which in part can cause glare, and diminished visual acuity.

In addition to the problems encountered with ultraviolet and blue light radiation, which affects the entire population, there are reported in the literature various special requirements based on optical diseases or conditions, and on occupations or activities in which a person engages. For example, a person with cataracts, diabetic retinopathy, corneal dystrophy, albinism, or extreme photophobia will have special visual needs not possessed by the general population. Also, people who engage in certain outdoor sports or activities, e.g., skiers, baseball players, football players, pilots, and boaters are exposed to high levels of ultraviolet, blue, and visible light radiation which can affect visual acuity required in such activities. Drivers of motor vehicles also have specific needs in terms of reducing glare and enhancing visual acuity under bright, sunlit driving conditions and reducing headlight glare at night. For these specific needs, alteration of light transmittance over the spectrum of visible light including the blue-violet end of the visible spectrum to the red end of the spectrum may be necessary. Boundaries of the visible spectrum have been reported by various authors. Formerly, the visible spectrum was commonly accepted as extending from 400 to 700 nm. More recently, the limits of the visible spectrum have been stated to be 380–760 nm.

Tinted spectacle or eyeglass lenses ("sunglasses") are used to reduce the amount of light transmitted to the eyes. Some sunglass lenses have incorporated an ultraviolet (UV) blocker to reduce the amount of UV incident upon the eyes. More recently, some sunglass lenses screen out both ultraviolet and blue light radiation. Sunglasses can be helpful to reduce the amount of light incident upon the eyes, but have various limitations which may make them unsuitable for certain activities. The use of sunglasses in sports activities is undesirable, as the sunglass frames may limit the field of view, particularly in peripheral viewing. Additionally, as the lenses are worn at a distance from the eyes, high-intensity light from around the lenses may be incident upon the eye, creating contrast aberrations and other unfavorable visibility conditions. Although attempts have been made to limit the light introduced from around sunglass lenses, such attempts are cumbersome and again may limit field of view.

Contact lenses positioned directly on the cornea of the eye have been used for correction of refractive errors of the eye. Tinting of contact lenses has developed for cosmetically altering the appearance of the eye or simply to allow the lens to be more easily handled. Some attempts have been made to provide the contact lenses with UV inhibitors for protection of the eye. Contact lenses are generally of two types, soft and hard, wherein soft lenses extend to the sclera, while hard lenses are positioned only on the cornea. Tinting may be provided over the entire lens, or only on a portion of the lens, for example that portion coinciding with the iris of the eye in a soft contact lens, for cosmetically altering the color of the person's eye.

Hard contact lenses, both tinted and clear, are polymeric in nature and employ as the matrix polymer a relatively hydrophobic transparent polymer, which is usually either methyl methacrylate (MMA) or a copolymer thereof. A hard lens may have incorporated therein either a polymerized or a nonpolymerizable ultraviolet (UV) absorber. For example, the 2-hydroxybenzophenones are known as UV absorbers. Their incorporation into plastics is also known. These compounds may be polymerizable, e.g., the 4,4'-di(acryloxy beta-hydroxypropyl) ether of 2,2',4,4'-tetrahydroxybenzophenone or non-polymerizable 2,2',4,4'-tetrahydroxybenzophenone and 2,2'-dihydroxy-4,4'-dimethoxybenzophenone.

Soft contact lenses, also widely called "hydrogel" contact lenses, are also polymeric in nature and employ a hydrophilic polymer is such as poly(2-hydroxyethyl methyl methacrylate) (polyHEMA) or a copolymer of 2-hydroxyethyl methacrylate. Various types of colorants for hydrophilic contact lenses have been reported. For example, both reactive dyes and vat dyes have been used as colorants for soft contact lenses. Vat dyes tend to leak or bleed out and so have not found widespread use. Reactive dyes, on the other hand will bond to the surface of the lens and do not bleed. Other types of dyes mentioned for hydrophilic contact lenses are water insoluble dyes and polymer bound dyes. Water insoluble dyes have a disadvantage in that a desired degree of tinting of a contact lens may not be obtainable because of the thinness of a contact lens.

Although both hard and soft contact lenses containing colorants are known, very little attention has been paid to the use of mixtures or combinations of colorants in contact lenses to obtain desired modification of transmittance characteristics in the visible spectrum. Therefore, in contrast to special purpose sunglasses or spectacles which are known, there is a need for special purpose contact lenses which will absorb substantially all incident UV and blue light and which have spectral transmittance characteristics over the remainder of the visible spectrum (e.g., about 500 to about 760 nm) which are tailored to meet specific needs of different categories of users.

SUMMARY OF THE INVENTION

This invention according to one aspect therefore provides a contact lens comprising (a) a transparent matrix polymer, at least a portion of which is tinted, and (b) a plurality of colorants for tinting the lens or a portion thereof. The colorants impart to the tinted lens or portion thereof (i) an essentially zero transmittance of radiation having wavelengths from 200 to about 500 nm, and (ii) a variable and wavelength-dependent transmittance of radiation having wavelengths from about 500 to 700 nm, wherein transmittance of radiation over a bandwidth of at least 50 nm in the range of 500 to 700 nm is less than 50%. Further, at wavelengths from 700 to 800 nm; the lens may transmit at least 80% of the light.

Broadly, this invention comprises two embodiments, i.e., (1) hard contact lenses, and (2) soft contact lenses. The hard contact lenses may comprise an essentially hydrophobic polymeric matrix material (typically polymethyl methacrylate, PMMA, or a methyl methacrylate copolymer) and two or more colorants which together impart a desired radiation transmittance characteristic to the matrix polymer. The colorants may be either polymerizable or nonpolymerizable.

The soft contact lens may comprise a hydrophilic matrix polymer and at least two colorants which together alter the light transmittance curve of the matrix polymer over the visible light range.

In another aspect of the invention, both the soft and hard contact lens embodiments may comprise tinting of a portion of the lens to alter the light transmittance characteristics in this portion of the lens over the visible light range. Tinting over a portion of the lens in the manner according to the invention allows the lens to be tailored for particular activates or light conditions, enhancing their usability and benefits relating to such light conditions. The lens may be tailored to meet specific needs of different categories of users, particularly with respect to uses in sports, recreational or other activities where special light conditions may exist. The tinted portion of the lens may correspond to the particular activity for which the lens was designed, or the tinting may be over a portion to allow more general use of the lens in a variety of light conditions and activities. In accordance with this aspect of the lens, there may be provided stabilization means for nonrotationally orienting the lens on the eye of a wearer, which may particularly be important if the tinted portion of the lens is not concentric about the center of the lens. The lens may further comprise translational means to cause the lens to move upwardly or downwardly in relation to the cornea by movement of the eyelids in conjunction with the position of the cornea. Movement of the lens in relation to the cornea will cause at least a portion of the lens which is tinted to be brought into the optical zone of the cornea to allow for selective filtering of the visible light in the optical zone.

This invention according to another aspect provides processes for preparing the above contact lenses.

DESCRIPTION OF THE PREFERRED EMBODIMENTS

This invention will now be described with reference to preferred embodiments thereof. All compositions herein are in parts or percentage by weight, unless the contrary is expressly stated.

Rigid Lenses

This invention according to one set of related embodiments provides a polymer composition, and a rigid lens formed from that composition. The description herein will be with particular reference to a hard contact lens, although for particular applications, other rigid lenses such as intraocular lenses may be formed.

The terms, "hard contact lens" and "rigid contact lens" (the two terms are used synonymously herein) are art-recognized terms denoting a contact lens having a hard, rigid, and essentially hydrophobic polymer matrix material.

Polymeric matrix materials for rigid or hard contact lenses of present invention are preferably hard contact lens materials which are known in the art. Typically, the material for a hard lens is a methyl methacrylate (MMA), homopolymer or copolymer. The matrix polymer may be a polymer or of one or more of the following monomers: methyl methacrylate (MMA), other lower alkyl methacrylates (e.g. ethyl methacrylate, propyl methacrylate, isopropyl methacrylate, butyl methacrylate, 2-ethylhexyl methacrylate, etc.). Other monomers such as trifluoroethyl methacrylate and 3-methacryloxypropyltris(trimethylsilyl)siloxane may be added to increase the oxygen permeability of the polymer.

The starting monomer formulation or mixture may also include a crosslinking agent, as for example ethylene glycol dimethacrylate or other difunctional (i.e., diolefinic) monomer or mixture thereof.

A starting monomer formulation also includes one or more polymerization initiators. These include, for example, benzoyl peroxide, lauryl peroxide, azobis(isobutyronitrile), 2,2'-azobis(2,4-dimethyl-4 methoxypropionitrile), and 2,2'-azobis(2-methylpropionitrile). These are used in small amounts which are well known in the art.

All monomers should be inhibitor-free.

The starting formulation also includes a plurality of (i.e., at least two) colorants or colorant precursors. These compounds may be either polymerizable or non-polymerizable.

Polymerizable colorants or colorant precursors include acryloxy- or methacryloxy-substituted 2,4-dihydroxybenzophenonic compounds such as 2-hydroxy-4-methacryloxybenzophenone, 2-hydroxy-4-(3-methacryloxy-2-hydroxy propyl)benzophenone and 2,2'-dihydroxy-4,4'-di(3-methacryloxy-2-hydroxypropyl)benzophenone. Polymerizable colorants or colorant precursors copolymerize with the principal monomer or monomers and thus become a chemically balanced part of a polymer molecule.

Non-polymerizable colorants are materials which do not undergo polymerization and which become physically trapped in the polymer matrix material which is formed on polymerization. Ordinarily, non-polymerizable colorants are preferred in the present invention.

Non-polymerizable colorants include ultraviolet (UV) absorbers such as 2,2',4,4'-tetrahydroxybenzophenone and 2,2'-dihydroxy-4,4'-dimethoxybenzophenone. Other UV-absorbing benzophenones are also known in the art and may be used herein.

Other colorants which may be used in the preparation of hard contact lenses or other rigid lenses according to this invention include the following:

4-[(2,4-dimethylphenyl)azo]2,4-dihydro-5-methyl-2-phenyl-3H-pyrazol-3-one;

1,4-bis[(4-methylphenyl)amino]9,10-anthracenedione; and 1,hydroxy-4-[(4-methylphenyl)amino]-9,10-anthracenedione.

Other suitable colorants for absorbing UV or light in the visible spectrum are also contemplated.

The term "colorant" is used herein in its art-recognized meaning to denote any substance that imparts color to another material or mixture, and to include white, black and grey as well as materials which impart hues in accordance with art-recognized usage. The colorants used herein are materials which alter the spectral transmittance curve of the matrix polymer in the visible light region, as opposed to materials which opacify a matrix polymer. One or more UV absorbers and one or more additional colorants may be used as necessary to obtain a desired spectral transmittance curve in a finished lens.

Rigid contact lenses have a diameter which is typically no greater, and usually slightly less, than the diameter of the cornea of a human eye. The diameter of a rigid contact lens of this invention will ordinarily be the same as the diameters of contact rigid contact lenses known in the art, e.g., from about 9 to about 11 millimeters. A representative diameter is 9.0 mm. A rigid contact lens is typically tinted or covered over its entire area, although only a portion of the lens may be tinted if desired. Ordinarily, the degree of tint or optical density is uniform over the entire area of the lens, but again a non-uniform tint may be applied if desired.

The starting materials, e.g., a monomer mixture as above described plus non-polymerizable ingredients such as the colorants described above, are mixed to achieve a uniform mixture and are then polymerized under conventional polymerization conditions to form a tinted lens.

Tinted rigid lenses of the present invention are characterized by an altered radiation transmittance characteristic in the visible light range (approximately 380 to 760 nm) and in the adjacent ultraviolet (UV) and infrared and (IR) region, i.e., from 200 to 1000 nm in wavelength as follows: (1) essentially no transmittance of incident light having a wavelength in the range of 200 to 500 nm; and (2) a variable and wavelength-dependent transmittance of light having a wavelength from 500 to 700 nm. Colorant combinations are chosen according to this invention so that such spectral transmission characteristics will be achieved over the lens or portion thereof.

Colorant combinations are chosen in the preferred embodiment so that spectral radiation transmission is virtually zero (i.e., no greater than 1%) for wavelengths up to 500 nm or the upper limit of blue light. Also, colorant combinations may be chosen to give spectral radiation transmission of at least 80% of wavelengths in excess of 700 nm. Other transmittance characteristics in the upper limits of the visible spectrum are also contemplated. The greatest variability in spectral characteristics between one formulation and another according to this invention is in the spectral range from about 500 to about 700 nm. Within that range, spectral characteristics are chosen to fit the particular problems and needs of the wearer. Generally, rigid lenses of this invention are so formulated that there is a light transmittance of less than 50% over a bandwidth of at least 50 nm within the range of 500 to 700 nm.

Shaping of a polymer as formed into a contact lens may be accomplished by means known in the art. For example, polymerization may be carried out in a cylindrical mold (e.g., a glass tube) followed by cutting the resulting polymer transversely into :buttons, and machining the buttons into lenses.

Figure 1:
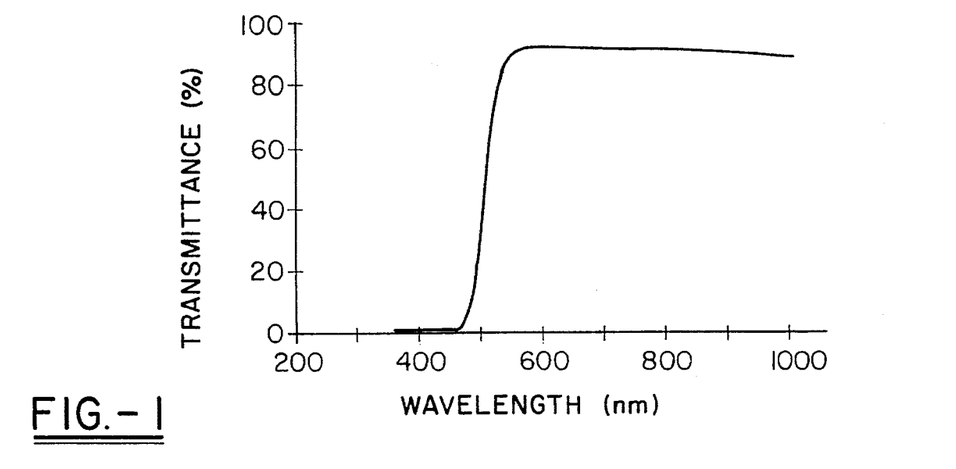
FIGS. 1–11 are radiation transmittance plots or curves showing percentage of transmittance of lenses prepared according to the invention, over the wavelengths of 200 to 800 nm. The figure numbers correspond to particular example numbers of the invention as to preferred embodiments, but do not limit the invention.
Figure 2:
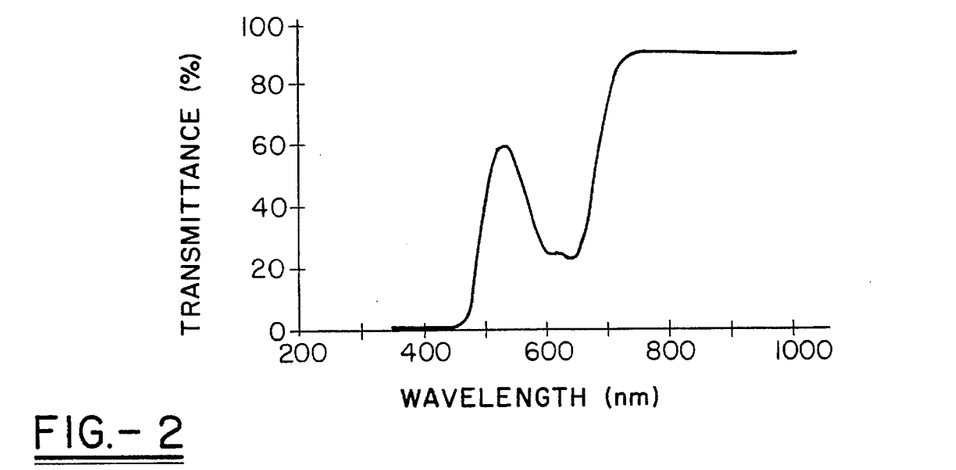
Figure 3:
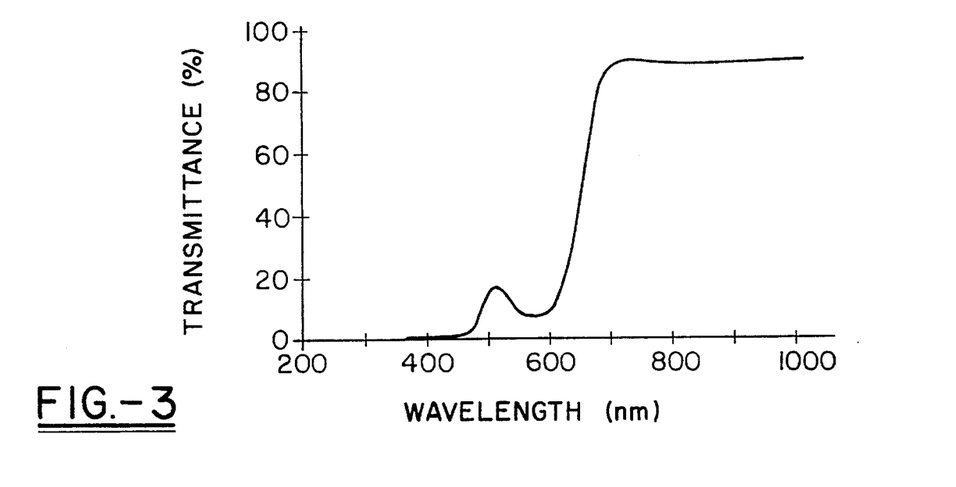

FIGS. 1, 2, and 3 illustrate specific spectral transmission curves which can be achieved in rigid lenses according to this invention. The spectral transmission curves shown in FIGS. 1, 2, and 3 are obtained in polymers prepared from the formulations described in Examples 1, 2, and 3, respectively.

Lenses prepared according to this invention are "colorfast", i.e., the colorant being essentially non-extractable under normal wearing conditions. Where non-polymerizable colorants are used, these are physically trapped and firmly held within the polymer matrix. The colorant may be uniformly distributed to give uniform optical density. Where a polymerizable colorant (or colorants) is (are) used, the colorant is chemically balanced since it becomes a part of the polymer's molecular structure.

This invention will now be described in greater detail with reference to the examples which follow. The compositions of starting formulations are given in percentage by weight, i.e., parts by weight based on 100 parts of total formulation ingredients (including non-polymerizable substances).

EXAMPLE 1

An ultra-violet and blue light absorbing fluoro-silicone-acrylate contact lens.

| Formulation (% by weight): | |
|---|---|
| 2,2,2-trifluoroethyl methacrylate | 30.0 |
| methyl methacrylate | 30.0 |
| 3-methacryloxypropyltris(trimethylsilyl)siloxane | 30.0 |
| ethylene glycol dimethacrylate | 2.0 |
| methacrylic acid | 6.8 |
| 2,2',4,4'-tetrahydroxybenzophenone | 0.75 |
| 4-[(2,4-dimethylphenyl)azo]-2,4-dihydro-5-methyl-2-phenyl-3H-pyrazol-3-one | 0.25 |
| 2,2'-azobis(2,4-dimethyl-4-methoxypropionitrile) | 0.15 |
| 2,2'-azobis(2-methylpropionitrile) | 0.05 |

All monomers were inhibitor free. The materials were stirred until dissolved. The solution was filtered, degassed and poured into glass tubes and capped. The mix was polymerized in a water bath at 20° C. for 12 hours. The polymer was post-cured 4 hours at 50° C., 4 hours at 85° C. and 2 hours at 100° C. The finished polymer was removed from the glass tubes and cut into buttons which were machined into gas permeable contact lenses. Lenses appear golden yellow in color. A 0.1 mm thick lens was found to absorb all light from 200 nm to 500 nm and transmit at least 95% of light from 550 nm to 800 nm. Transmittance from 500 to 550 nm is characterized by a sharply rising slope from essentially zero at 500 nm to 95% at 550 nm. The mean transmittance in this range of wavelengths is less than 50%, giving additional filtering of the visible spectrum above the 500 nm wavelength light absorbed.

The light transmittance curve, showing percentage of light transmittance versus wavelength for the polymer of Example 1 is shown in FIG. 1.

Lenses prepared according to Example 1 have substantially complete absorption of UV light from 200 to 380 nm, as well as virtually complete absorption of visible light from 380 to 500 nm in the blue portion of the spectrum. This provides the lens which affords the wearer increased protection against macular degeneration and other diseases of the eye caused by overexposure to ultraviolet radiation. In addition, by screening visible light at the blue end of the spectrum it affords the wearer comfort and visual acuity in both bright sunlight and haze. The lens also provides additional protection against glare without appreciably reducing visible light transmission by partially absorbing light in the transition region just above 500 nm. The golden yellow color provides an aesthetically pleasing green shade to blue eyes and does not substantially alter the appearance of brown eyes.

EXAMPLE 2

An ultra-violet and blue light absorbing green silicone-acrylate contact lens.

| Formulation (% by weight): | |
| --- | --- |
| methyl methacrylate | 45.0 |
| 3-methacryloxypropyltris(trimethylsilyl)siloxane | 45.0 |
| ethylene glycol dimethacrylate | 2.0 |
| methacrylic acid | 6.7 |
| 2,2'.4,4'-tetrahydroxybenzophenone | 0.75 |
| 4-[(2,4-dimethylphenyl)azo]-2,4-dihydro-5-methyl-2-phenyl-3H-pyrazol-3-one | 0.25 |
| 1,4-bis[(4-methylphenyl)amino]-9,10-anthracenedione | 0.10 |
| 2,2'-azobis(2,4-dimethyl-4-methoxypropionitrile) | 0.15 |
| 2,2'-azobis(2-methylpropionitrile) | 0.05 |

The mixture was polymerized in a manner similar to Example 1. The resultant lens was green in color. A 0.1 mm thick lens was found to absorb all light from 200 nm to 500 nm. Transmittance of light above 500 nm rises rapidly with increasing wavelength, from substantially zero at 500 nm to 60% at 530 nm. Transmittance of light drops to 30% (70% absorption) in a region of the visible spectrum from 530 nm to 650 nm. From 650 nm to 700 nm, transmittance rises rapidly with increasing wavelengths to a maximum of 95% transmittance at wavelengths above 700 nm.

FIG. 2 shows the light transmittance curve of the lens of Example 2. In this example also, the desired absorption of UV light as well as visible light in the blue region of the spectrum is substantially complete. Visual acuity is enhanced in a variety of light conditions by means of this filtering. Additional filtering in the visible spectrum, particularly at wavelengths between 530 nm and 650 nm provides additional benefits of filtering scattered light in a dominant portion of the visible spectrum, related to wavelengths at which eye sensitivity is greatest. Such a lens enhances visual acuity and contrast under light conditions where incident light is relatively intense, and may be useful in sporting events or activities where bright sunlight or bright lights are encountered. The lens has an aesthetically pleasing appearance when worn on the eye, and from its positioning on the cornea, filters substantially all light incident upon the wearer's eyes.

EXAMPLE 3

| Formulation (% by weight): | |
| --- | --- |
| methyl methacrylate | 96.3 |
| ethylene glycol dimethacrylate | 1.5 |
| methacrylic acid | 0.5 |
| 2,2'.4,4'-tetrahydroxybenzophenone | 0.75 |
| 4-[(2,4-dimethylphenyl)azo]-2,4-dihydro-5-methyl-2-phenyl-3H-pyrazol-3-one | 0.25 |
| 1,hydroxy-4-[(4-methylphenyl)amino]-9,10-anthracenedione | 0.5 |
| 2,2'-azobis(2,4-dimethyl-4-methoxypropionitrile) | 0.1 |
| 2,2'-azobis(2-methylpropionitrile) | 0.03 |

The mixture was polymerized as Example 1. The resultant lens was gray in color. A 0.1 mm thick lens absorbs all light from 200 nm to 500 nm and 90% of light from 550 nm to 610 nm. The lens of Example 3 further shows a peak transmittance of about 15% at 520 nm. This lens is further characterized by a rapid rise in light transmittance with increasing wavelength from 610 to 700 nm. Transmittance of light at wavelengths above 700 is 95%. The gray lens of this example again provides filtering of substantially all UV and blue light, with additional filtering of the visible spectrum in a region between 500 and 610 nm, again providing benefits of additional filtering in high intensity light conditions.

Intraocular lenses may have the same composition and may be prepared in the same way as rigid contact lenses according to this invention. As an intraocular lens is implanted into a human eye to replace the natural crystalline lens of the eye, the light transmittance characteristics of the lens would be a permanent part of a person's vision. Particular filtering of light in the visible spectrum in accordance with the invention would be directed to particular characteristics of a patient and the therapeutic results desired for a particular patient to enhance visual acuity, diminish effects of light intolerance or other aspects related to a particular patient. The light transmittance characteristics may therefore be tailored for a particular individual and the characteristics of their vision, with an intraocular lens directed to therapeutic applications, for example, while a contact lens may be used in a particular activity and removed for normal vision. The ability to produce transmittance characteristics related to a particular individual, or to a particular activity in which light conditions are unique, allows flexibility to tailor the lens for these particular purposes. The color of the lenses produced in the foregoing examples also provides flexibility in fitting the use of the lens to a particular person and/or activity. Wearers of the lens in accordance with the invention may have distinct preferences regarding the color of the lens in conjunction with the filtering properties associated therewith, corresponding to providing enhanced visual capacity for a particular activity or person.

Soft Contact Lenses

This invention will now be described in further detail with reference to a second embodiment thereof. This second embodiment is directed to "soft" contact lenses, which are based on a hydrophilic or hydrogel polymer.

The polymer for a soft or hydrophilic contact lens or this invention may be a polymer which is known in the art for this purpose.

Hydrophilic polymers for soft contact lenses may be prepared by polymerizing one or more monofunctional monomers which will provide a polymer having hydrophilic groups which afford hydrophilicity. A preferred and widely used monomer is 2-hydroxyethyl methacrylate (HEMA). HEMA may be either the sole monomer or a co-monomer as is well known. Other suitable monomers include hydroxyalkyl acrylates and methacrylates, and polymerizable unsaturated acids such as acrylic, methacrylic, itaconic, fumaric, and maleic acids.

Co-monomers include heterocyclic N-vinyl compounds containing a carbonyl functionality adjacent to the nitrogen in the ring, and particular N-vinyl lactams such as N-vinyl pryrolidone.

A crosslinking agent may be used in the synthesis of a hydrophilic base polymer for soft contact lenses. The crosslinking agent is a di- or multi-functional monomer and is used in small amounts as is well known in the art. Representative crosslinking agents include ethylene glycol dimethacrylate, triethylene, glycol dimethacrylate and trimethylolpropane trimethacrylate. The cross linking agents are typically dimethacrylates or diacrylates, although dimethacrylamides are also known.

A particularly preferred hydrophilic polymer for soft or hydrophilic contact lenses of this invention is a copolymer of HEMA and N-vinyl pyrrolodone. A suitable copolymer is available from Flexiens under the USAN "heflicon A". A hydrophilic base polymer is transparent and is preferably clear.

At least a portion of the hydrophilic lens is colored or tinted by application of two or more reactive dyes vat dyes or other dyes or pigments. In the preferred embodiment, reactive dyes together impart a transmittance curve such that the lens transmits substantially no incident radiation having a wavelength of 200 to 500 nm. Between 500 nm and 800 nm, the transmittance characteristic is variable and wavelength-dependent. Different lenses within the scope of the this invention have different light transmittance characteristics in the 500 to 800 nm range. Indeed, this invention makes it possible to achieve various transmittance characteristics within that range, to fit the needs of different users, by choosing combinations and relative amounts of reactive dyes which will give a desired transmittance curve.

Representative reactive dyes which can be used in the practice of this invention include the following:

benzene sulfonic acid, 4-(4,5-dihydro-4-((2-methoxy-5-methyl-4-((2-(sulfooxy)ethyl)sulfonyl)phenyl)azo-3-methyl-5-oxo-1H-pyrazol-1-yl);

[2-naphthalenesulfonic acid, 7-(acetylamino)-4-hydroxyl-3-((4-((sulfooxyethyl)sulfonyl)phenyl)azo)-];

[5-((4,6-dichloro-1,3,5-triazin-2-yl)amino-4-hydroxy-3-((1-sulfo-2-naphthalenyl)azo-2, 7-naphthalene-disulfonic acid, trisodium salt];

[copper, 29H, 31H-phthalocyaninato(2-)-$N_{29}$, $N_{30}$, $N_{31}$, $N_{32}$)-,sulfo((4((2-sulfooxy)ethyl)sulfonyl)phenyl)amino)sulfonyl derivative]; and

[2,7-naphthalenesulfonic acid, 4-amino-5-hydroxy-3,6-bis( (4-((2-(sulfooxy)ethyl)sulfonyl)phenyl)azo)-tetrasodium salt].

Reactive dyes, after fixing become chemically bonded to the surface of the lens, so that the lens is colorfast and the dye is non-extractable or won't leach out of the lens.

Other types of dyes, e.g. vat dyes, water-soluble dyes, water-insoluble dyes which may be disbursed in a matrix polymer and polymer-bound dyes have also been suggested as colorants for soft contact lenses. For various reasons, reactive dyes are preferred for the present invention, but other colorants may be used.

Reactive dyes are colorfast and can be provided in optical densities sufficient to impart desired tinting to a soft contact lens, in spite of the thinness of a soft contact lens.

Either the entire soft contact lens or a portion thereof can be tinted in accordance with this invention. For example, only a circular region in the center of the lens, typically having a diameter of 9–11 mm, may be tinted. This zone corresponds to the optical zone of the lens or extends beyond the optical zone. A conventional soft contact lens has a diameter of about 14 mm. This is larger than the typical diameter of the iris of a human eye (which is typically about 9–11 mm). For cosmetic reasons, the peripheral portion of the lens, which overlies the sclera, may be left uncolored.

Colored contact lenses of the present invention can be prepared by a process similar to that described in U.S. Pat. No. 4,733,959 to Claussen et al or other known processes. First, a suitable hydrophilic matrix polymer (the composition of which has been described above) can be synthesized and then lathe cut to give a clear contact lens according to methods known in the art. Then an aqueous tinting solution, containing two or more reactive dyes as described above, and sodium chloride, is first prepared and then activated by addition to a dilute sodium carbonate solution, followed by heating to an elevated temperature (usually from 40° to 80° C.; typically 60° C.) to activate the dye. An assembly comprising a clear lens in a masking device, which may be as disclosed in Pat. No. 4,733,959, is then immersed in the activated tinting solution bath. Using masking devices, a desired area of the lens is tinted while the masking device prevents tinting of those portions of the lens where masking is applied. The lens/mask assembly is immersed in the tinting solution bath for a time sufficient to achieve a desired degree of tint (optical density) and is then removed. Tinting time is usually 2 to 20 minutes, more preferably 5 to 10 minutes. These times are representative but not critical, since the length of immersion time depends on the degree of tint desired, which can be simply determined experimentally. The lens/masking device assembly is then removed from the tinting solution and placed in a suitable mild alkaline solution, e.g. 0.2M sodium carbonate, at an elevated temperature (typically 50°–90° C., especially 60° C.) to fix the dye. Fixing causes the dye to become chemically bonded to the surface of the lens.

This description will be described in further detail with reference to the examples which follow. All percentages are by weight unless expressly stated. The volume of tinting solution in all examples was 20 ml unless otherwise expressly stated.

EXAMPLE 4

A soft contact lens of golden yellow shade.

A heflicon A (poly-2-hydroxyethyl methacrylate-co-N-vinyl-2-pyrrolidone) contact lens was tinted using the method and a reusable masking device as described in U.S. Pat. No. 4,733,959. The reusable masking device was designed to mask the outer region of the lens and to allow the 10 mm circular region in the center of the lens to be tinted. The lens was placed in the masking device.

A tinting solution was prepared as follows: 20 ml of a 5% by weight solution of benzene sulfonic acid, 4-(4,5-dihydro-4-((2-methoxy-5-methyl-4-((2-(sulfooxy)ethyl)sulfonyl)phenyl)azo-3-methyl-5-oxo-1H-pyrazol-1-yl)(reactive yellow 15) in 0.85M sodium chloride. This solution was filtered and added to 80 ml of 0.2M sodium carbonate solution, and heated to 60° C. to activate the dye. The prepared masking device containing the lens to be tinted was placed in the tinting solution. After 8 minutes, the masking device was removed and placed in 0.2M sodium carbonate solution at 60° C. to fix the dye. The length of time required depends upon the activity of the dye and the intensity of the tint desired. After 30 minutes the masking device was removed from the fixing bath and disassembled. The tinted lens was cleaned, equilibrated in normal saline solution, and sterilized.

The tinted portion of the lens appeared golden yellow in color. The tinted portion of the lens absorbed all light from 200 nm to 500 nm and transmitted at least 90% of light from 550 nm to 800 nm. The spectral transmittance curve rose sharply with increasing wavelengths from 500 to 550 nm, and in a mean transmittance in this region of less than 50%.

Figure 4:
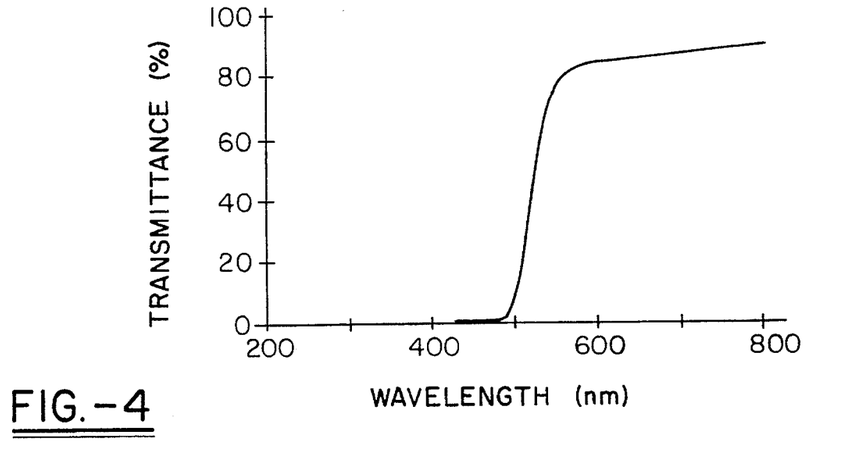

The spectral transmittance curve of the lens in this example is shown in FIG. 4.

This example represents a comparison example using a single reactive dye. The reactive dye composition provides filtering characteristics to substantially eliminate UV and blue light incident upon the retina, along with filtering of a portion of the green spectrum, providing enhanced contrast in outdoor light environments. While providing the benefits associated with filtering in a portion of the visible spectrum, the lens does not substantially affect light in the yellow, orange, and red portions of the visible spectrum. The lens of this example is a general purpose contact lens for protecting the retina by screening out essentially all radiation, ultraviolet and blue, from 200 to 500 rim, while affording a high degree Of light transmittance from 550 to 800 nm.

EXAMPLE 5

A soft contact lens of orange shade.

Figure 5:
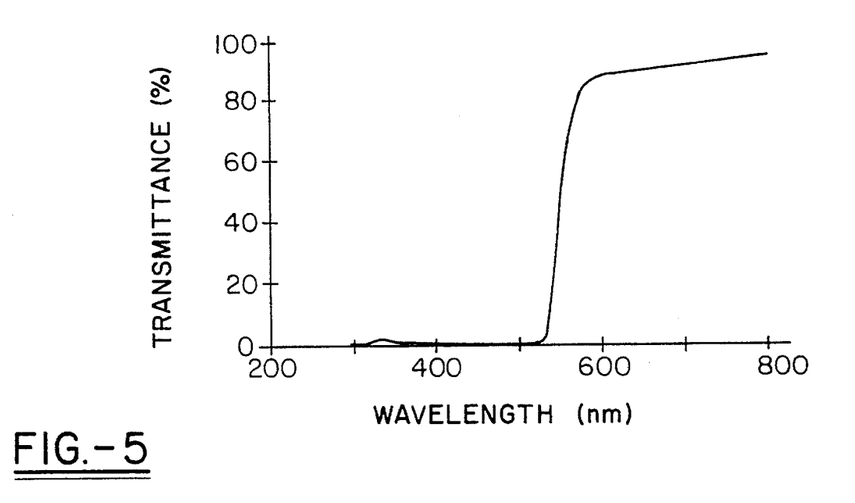

The procedure of Example 4 was repeated with the following tinting solution: a 5% solution of [2-naphthalenesulfonic acid, 7-(acetylamino)-4-hydroxyl-3-((4-((sulfooxyethyl)sulfonyl)phenyl)azo)-](reactive orange 78) in 0.85M sodium chloride. The tinted portion of the lens appeared orange in color. The tinted portion of the lens absorbed all light from 200 nm to 530 nm and transmitted at least 90% of light from 600 nm to 800 nm. The spectral transmittance curve of this lens rose sharply with increasing wavelengths from 530 to 600 nm.

The spectral transmittance curve of the lens of this example is shown in FIG. 5. As shown in FIG. 5, the spectral transmittance of this lens again filters a portion of the green light along with substantially absorbing all UV and blue light. The orange shade of the lens provides more blue-green absorption, and increases contrast where higher intensities of yellow light are present, such as where light is generated from mercury vapor lamps, such as in a sports stadium or arena. Again, the remaining portion of the visible spectrum is not substantially affected by the lens of this example, allowing use of the lens in other than high intensity light environments. The lens of this lens example like the lens of Example 4 is a general purpose lens which protects the retina from ultraviolet and blue radiation along with providing additional benefits. This lens makes a light blue iris appear brown and intensifies the color of a brown iris.

EXAMPLE 6

A soft contact lens of orange-red shade.

The procedure of Example 4 was repeated with the following tinting solution: a 2.5% solution of [2-naphthalenesulfonic acid, 7-(acetylamino)-4-hydroxyl-3-((4-((sulfooxyethyl)sulfonyl)phenyl)azo)-](reactive orange 78) and 2.5% of [5-((4,6-dichloro-1,3,5-triazin-2-yl)amino-4-hydroxy-3-((1-sulfo-2-naphthalenyl)azo2, 7-naphthalene-disulfonic acid, trisodium salt] in 0.85M sodium chloride. The tinted portion of the lens appeared orange-red in color. The tinted portion of the lens absorbed all light from 200 nm to 560 nm and transmitted at least 90% of light from 610 nm to 800 nm. The spectral transmittance curve of this lens rose sharply with increasing wavelengths from 560 to 610 nm.

Figure 6:
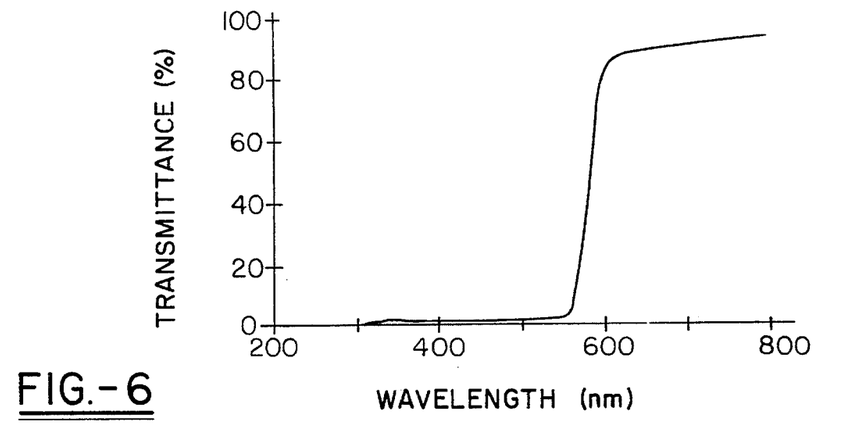

The spectral transmittance curve of the lens of this example is shown in FIG. 6.

The lens of this example is particularly useful in particular light environments such as those stated with respect to Example 5, wherein again the lens will provide absorption of additional blue-green light, providing stronger contrast effects and reducing haze. The increase in transmittance of light above 560 nm provides filtering of blue-green wavelength light in association with substantially complete absorption below 560 nm.

EXAMPLE 7

A soft contact lens of red shade.

The procedure of Example 4 was repeated with the following tinting solution: a 5% solution of [5-((4,6-dichloro-1,3,5-triazin-2-yl)amino-4-hydroxy-3-((1-sulfo-2-naphthalenyl)azo-2,7-naphthalene-disulfonic acid, trisodium salt and 1% of benzene sulfonic acid, 4-(4,5-dihydro-4-((2-methoxy-5-methyl-4((2-(sulfooxy)ethyl)sulfonyl)phenyl)azo-3-methyl-5-oxo-1H-pyrazol-1-yl) (reactive yellow 15) in 0.85M sodium chloride. The tinted portion of the lens appeared red in color. The tinted portion of the lens absorbed all light from 200 nm to 580 nm and transmitted at least 90% of light from 630 nm to 800 nm. The spectral transmittance curve of this lens rose sharply with increasing wavelengths from 580 to 630 nm.

Figure 7:
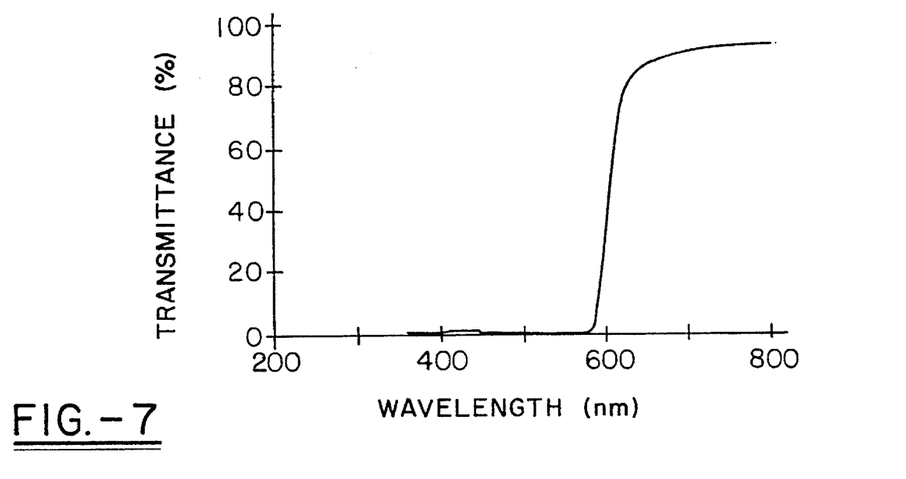

The spectral transmittance curve of the lens of this example is shown in FIG. 7.

The lens of this example is particularly useful to filter additional wavelengths of blue-green light in portions of the yellow spectrum to provide varying contrast effects, particularly in outdoor sunlit environments. Such a lens may also be useful in cutting haze in such environments.

EXAMPLE 8

A soft contact lens of yellow-green shade.

Figure 8:
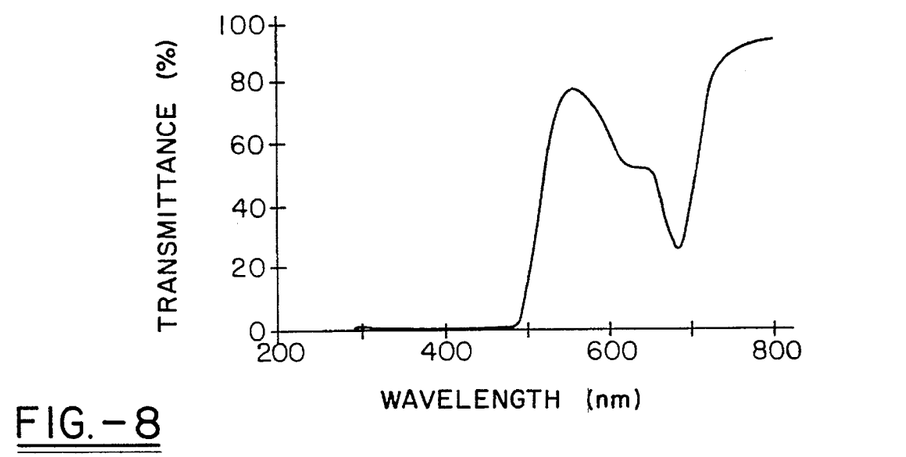

The procedure of Example 4 was repeated with the following tinting solution: a 5% solution of benzene sulfonic acid, 4-(4,5-dihydro-4-((2-methoxy-5-methyl-4-((2-(sulfooxy)ethyl)sulfonyl)phenyl)azo-3-methyl-5-oxo-1H-pyrazol-1-yl) (reactive yellow 15) and 1% of [copper, 29H, 31H-phthalocyaninato(2-)-$N_{29}$, $N_{30}$, $N_{31}$, $N_{32}$)-,sulfo((4-((2-sulfooxy)ethyl)sulfonyl)phenyl)amino)sulfonyl derivative] (reactive blue 21) in 0.85M sodium chloride. The tinted portion of the lens appeared yellow-green in color. The tinted portion of the lens absorbed all light from 200 nm to 490 nm and from 40 to 70% of light from 600 nm to 700 nm. The transmittance curve of this lens shows a valley (approximately 30% transmittance) at 680 nm and a high degree of transmittance (over 90%) at 720 to 800 nm. A lens having these transmittance characteristics provides additional filtering of light having wavelengths from 600 nm to 700 nm, being the orange and red portions of the visible spectrum. In addition to filtering of this type in the visible spectrum, the lens also substantially absorbs all light in the UV spectrum and much of the blue light found to be adverse to health of the retina. In particular lighting environments, reducing the amount of orange and red light provides better contrast or better overall viewing characteristics. For example, where artificial light is produced by sodium lamps, which also are widely used in stadiums, arenas or the like, higher intensities of orange and red light are produced. The lens of this example would provide better contrast and visibility in this environment.

The light transmittance curve of the lens of this example is shown in FIG. 8.

EXAMPLE 9

A soft contact lens of green shade.

The procedure of Example 4 was repeated with the following tinting solution: a 5% solution of benzene sulfonic acid, 4-(4,5-dihydro-4-((2-methoxy-5-methyl-4-((2-(sulfooxy)ethyl)sulfonyl)phenyl)azo-3-methyl-5-oxo-1H-pyrazol-1-yl) (reactive yellow 15) and 3% of [copper, 29H, 31H-phthalocyaninato(2-)-$N_{29}$, $N_{30}$, $N_{31}$, $N_{32}$)-,sulfo((4-

((2-sulfooxy)ethyl)sulfonyl)phenyl)amino)sulfonyl derivatives] (reactive blue 21) in 0.85% sodium chloride. The tinted portion of the lens appeared green in color. The tinted portion of the lens absorbed all light from 200 nm to 490 nm and all light from 600 nm to 700 nm. This lens is further characterized by a transmittance peak (approximately 40–45% transmittance) at 550 nm which corresponds to green light, and a transmittance which rises sharply with increasing wavelengths between 700 and 800 nm.

Figure 9:
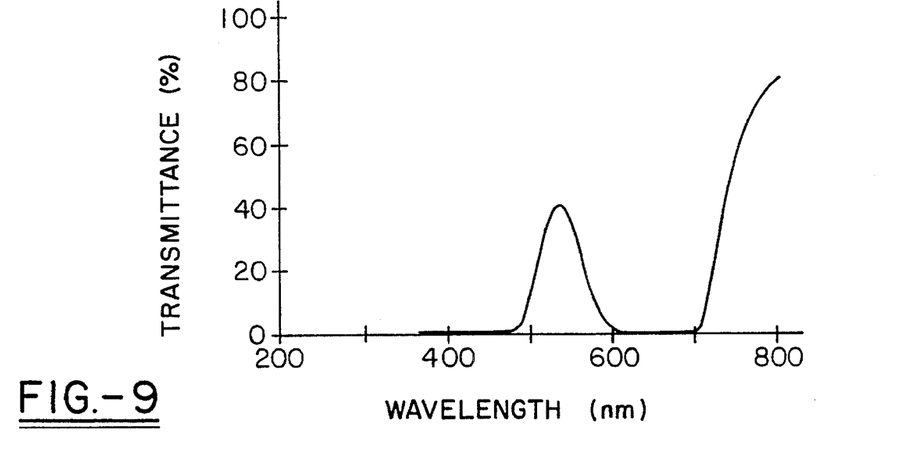

The transmittance curve of the lens of this example is shown in FIG. 9.

The lens of this example is particularly useful when the only desired portion of the visible spectrum is near the center (i.e., 500–600 nm), corresponding to green light, and where high transmittance at the red end of the spectrum and the adjacent portion of the IR spectrum (700–800 nm) is acceptable.

EXAMPLE 10

A soft contact lens of brown shade.

Figure 10:
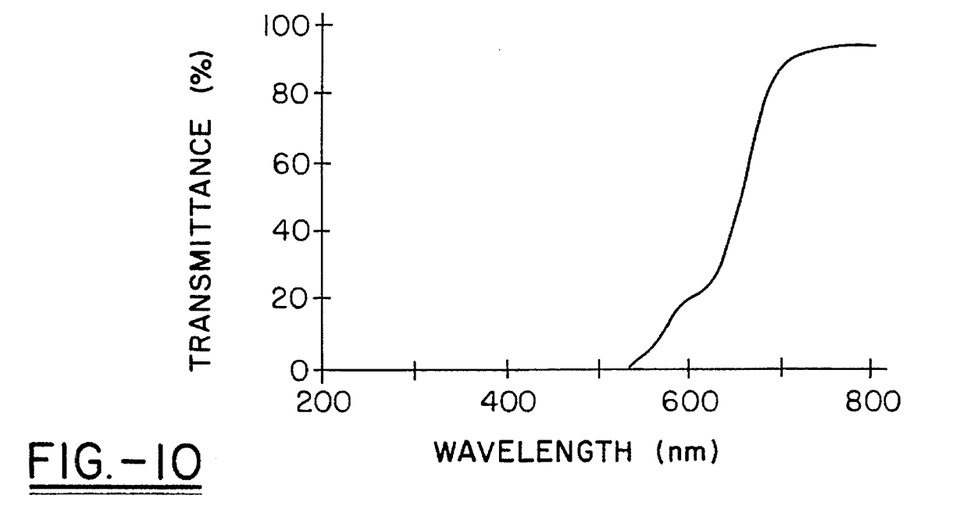

The procedure of Example 4 was repeated with the following tinting solution: 5% solution of [2-naphthalenesulfonic acid, 7-(acetylamino)-4-hydroxyl-3-((4-((sulfooxy-ethyl)sulfonyl)phenyl)azo)-](reactive orange 78) and 2% of [2,7-naphthalenesulfonic acid, 4-amino-5-hydroxy-3,6-bis((4-((2(sulfooxy)ethyl)sulfonyl)phenyl)azo)-tetrasodium salt](reactive black 5) in 0.85 sodium chloride. The tinted portion of the lens appeared brown in color. The tinted portion of the lens absorbed all light from 200 nm to 530 nm and transmitted at least 90% of light from 700 nm to 800 nm. The transmittance curve rises with increasing wavelength between 530 nm and 700 nm, but transmittance varies over this portion of the visible spectrum as shown in the transmittance curve of the lens shown in FIG. 10.

EXAMPLE 11

A soft contact lens of gray shade.

Figure 11:
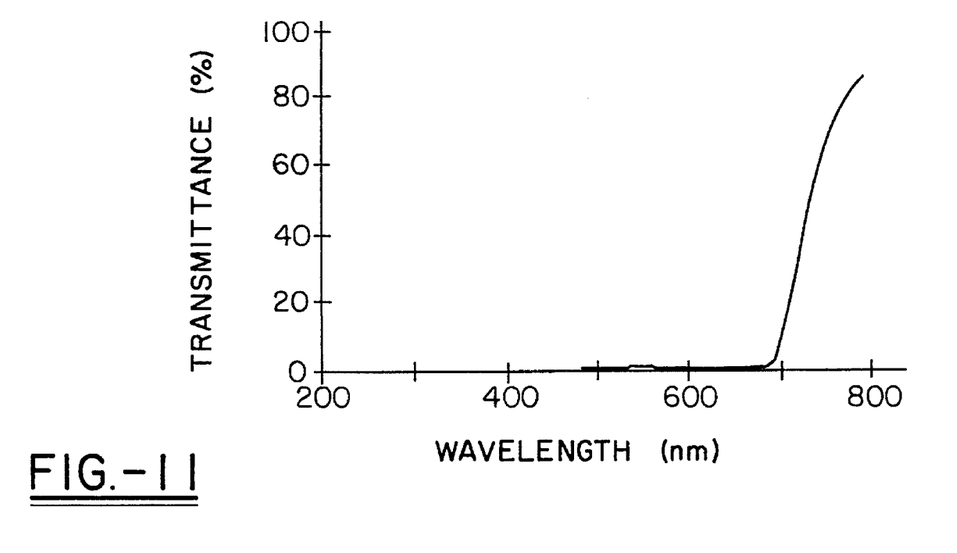

The procedure of Example 4 was repeated with the following tinting solution: a 5% solution of benzene sulfonic acid, 4-(4,5-dihydro-4-((2-methoxy-5-methyl-4-((2-(sulfooxy)ethyl)sulfonyl)phenyl)azo-3-methyl-5-oxo-1H-pyrazol-1-yl) (reactive yellow 15) and 1% of [5-((4,6-dichloro-1,3,5-triazin-2-yl)amino-4-hydroxy- 3-((1-sulfo-2-naphthalenyl)azo-2,7-naphthalene-disulfonic acid, trisodium salt and 1% of [copper, 29H, 31H-phthalocyaninato(2-)-N $_{29}$, N $_{30}$, N $_{31}$, N $_{32}$)-,sulfo((4-((2-sulfooxy)ethyl)sulfonyl)phenyl)amino)sulfonyl derivatives.]((reactive blue 21) in 0.85% sodium chloride. The tinted portion of the lens appeared gray in color. The tinted portion of the lens absorbed all light from 200 nm to 670 nm. Spectral transmittance rose rapidly with increasing wavelengths from 670 nm to 800 nm.

The spectral transmittance curve of the tinted portion of the lens of this example is shown in FIG. 11.

The lens of this example is particularly useful in high-intensity light environments, wherein a large portion of the visible spectrum is completely absorbed by the lens. The transmittance characteristics of the lens predetermine enable a, portion of the visible light to pass to allow such lenses to be used in association with particular sources of light in high-intensity environments. Again, as previously indicated with respect to rigid lenses, particular transmittance characteristics may be tailored a for particular activity or environment. The various examples of activities or environments in which particular transmittance characteristics would be beneficial show various preferred examples, but are not intended to limit the invention solely to their details.

In accordance with the invention, the reusable masking device used to mask a region of the lens in the foregoing examples may be shaped to mask any desired portion of the lens for particular applications. For example, tinting of only an upper portion of the lens as it is positioned on the eye, would provide light filtering characteristics as desired for light incident upon the eye from directions above the eye. Such a lens may particularly be useful for light conditions encountered in sporting events, outdoor activities, or the like. Other masking or similar procedures to tint the lens only over a desired portion thereof are contemplated herein and may be used for any particular application. The ability to tint only a portion of the lens would also enable the lens to function properly upon changing light conditions to which the wearer may be exposed.

Figure 12:
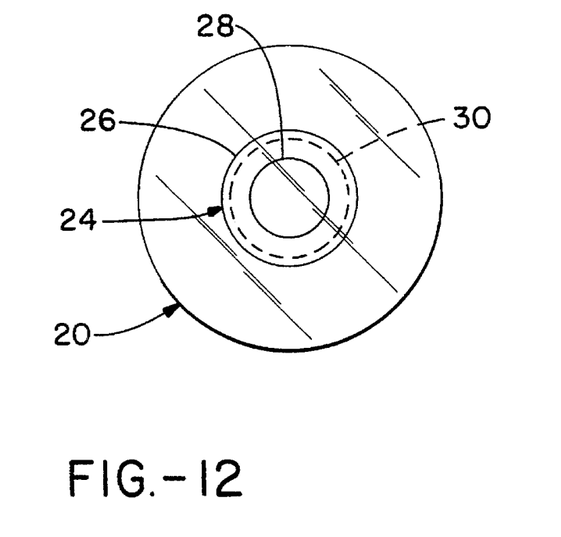
FIG. 12 and 13 show a first embodiment of a contact lens according to the invention.
Figure 13:
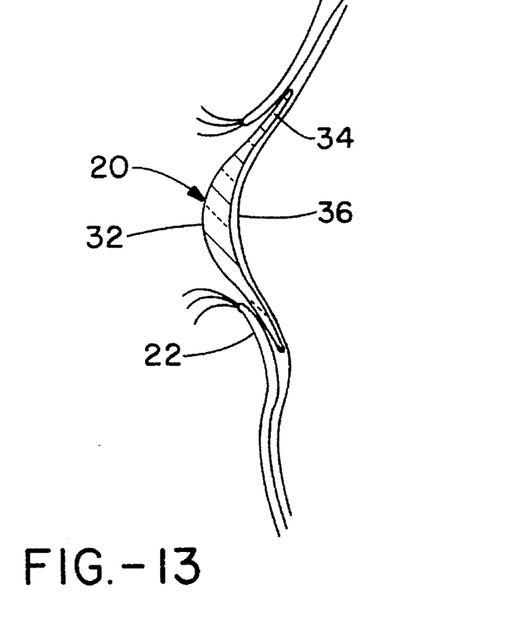

According to this aspect of the invention, FIGS. 12 and 13 show a first embodiment of the contact lens according to the invention, tailored for use in particular light environments. The lens is generally designated 20, and although being shown as a soft contact lens having a peripheral portion which extends under the eyelids 22 of a patient, the lens 20 may be formed as a hard or rigid gas permeable contact lens also. The lens 20 is provided with a tinted portion generally designated 24, which itself may have several zones of tinting, shown at 26 and 28. In this embodiment, tinting of the lens occurs on a portion formed at a center region of the lens in annular zones about the center of the lens. Tinting of the center region of the lens corresponds to at least a portion of the optical zone 30 of the lens 20. The optical zone 30 of the lens is generally the portion of the lens through which light rays incident on the retina of the eye which travel through the cornea and pupil of the eye pass. Although the actual zone of lens 20 through which light rays travel to be incident upon the retina will vary according to the size of the pupillary aperture of the eye, the optical zone 30 should be larger than the diameter of the pupil in a normal dilated state. In accordance with this embodiment, the lens 20 is tinted over a central region 28, which is smaller than the optical zone 30. In a preferred embodiment, zone 28 may have a diameter of between 1–5 mm, thereby forming an annular tinted zone extending over only a portion of the optical zone 30. The further tinted portion 26 of lens 20 may also be an annular zone extending around region 28, having a diameter which extends beyond optical zone 30. In a preferred embodiment, tinted region 28 of lens 20 provides transmittance characteristics through this region in accordance with the invention, wherein a variable and wavelength-dependent transmittance of light is provided in the visible spectrum at wavelengths between 500–700 nm. Region 28 may also be provided with tinting to eliminate transmittance of incident light having a wavelength in the range of 200–500 nm as desirable in the preferred embodiment. The zone 26 in a preferred embodiment will also eliminate transmittance of incident light having a wavelength in the range of 200–500 nm, and may otherwise transmit remaining portions of the visible spectrum. Alternatively, zone 26 may simply be eliminated, leaving only a central tinted portion 28 if desired. It should also be recognized that although zones 26 and 28 have been indicated as discrete annular zones on lens 20, this representation is simply for purposes of description, and the zones 26 and 28 may be generally blended together, or the entire tinted region of the lens may be provided with a gradation of tint from a central region of the lens toward its periphery.

In this embodiment, the central tinted portion 28 of the lens is designed to filter a portion of the visible spectrum to reduce glare, haze or other visual phenomena, particularly in high-light intensity environments. In the preferred embodiment, the tinted region 28 has a diameter which is substantially equal to or greater than the average diameter of a pupil upon constriction of the pupil under high-intensity light intensity conditions. In this manner, substantially all light incident upon the retina through the pupil under high-light conditions will travel through the central tinted zone 28, with transmittance characteristics over this zone effectively filtering substantially all the light incident upon the retina. In environments of lesser light intensity, the tinted zone 28 will cover only a portion of the area of the lens through which light incident upon the retina passes as the pupil dilates in such an environment. As previously indicated, the preferred embodiment will include zone 26, which is tinted to absorb UV and possibly blue light. The region 28 may alternatively be left untinted, with the preferred embodiment transmitting a proportionally greater amount of visible light than zone 28. In this manner, as the pupil dilates in lower-light environments, more visible light is transmitted through the lens to be incident upon the retina, allowing proper visibility in lower-light conditions. The lens 20 of this embodiment adapts to different light environments, allowing it to be worn in a variety of such environments.

In the preferred embodiment, lens 20 is also provided with centration means to keep the lens centered on the cornea of the eye, thereby positioning the tinted portion of the lens substantially coaxial to the pupil of the eye and the visual axis, even during eye movement. In FIG. 13, the lens is shown to include an increased central thickness at 32, with thin peripheral regions at 34. The thin peripheral carrier portion 34 of the lens extends under the eyelids 22 of the wearer, with the increased thickness central portion 32 forced by the eyelids 22 to remain over the center of the cornea 36. As an alternative to the centration means of the embodiment shown in FIG. 13, the lens 20 may be provided with peripheral ballast, grooves, double slab-off or other mechanisms for maintaining proper centration with the visual axis are contemplated.

Figure 14:
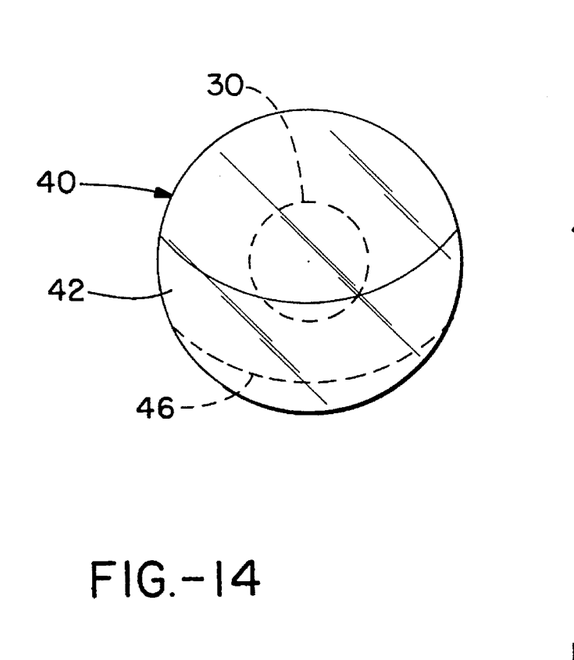
FIGS. 14 and 15 relate to another embodiment of the contact lens according to the invention.
Figure 15:
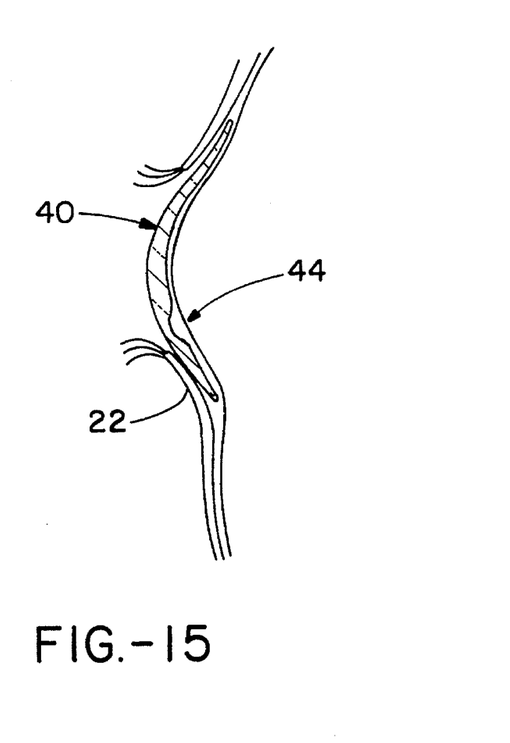

Turning now to FIGS. 14 and 15, another embodiment of the invention is shown, wherein lens 40 has a tinted portion 42 provided at a lower portion of the lens. In this embodiment, the tinted portion 42 may include only a portion of the optical zone 30 of the lens, or may be over a portion of the lens which does not include any of the optical zone 30 through which light passes through the pupil when lens 40 is centered on the cornea of the eye. In this embodiment, the lens includes translational means, allowing tinted portion 42 to translate relative to the cornea of the eye so as to bring region 42 upwardly toward the visual axis. For example, the translational means may be provided as prism ballast formed in a portion of the lens, such as at 44, where a basedown prism is formed at a lower part of the lens. The prism ballast is acted upon by the eyelid 22 to decenter the lens relative to the cornea upon eye movement. For example, in this embodiment, the lens 40 is made to decenter upwardly as the eye gazes downwardly to translate tinted portion 42 toward the visual axis, wherein the tinted portion of the lens will alter the transmittance of light through the pupil as the wearer gazes downwardly. As an alternative to using prism ballast, the lens 40 may be provided with truncation as at 46. Truncation 46 may provide such translational means, either alone or in conjunction with the use of prism ballast as previously described. Such a lens may therefore be useful under light conditions where higher intensity light is incident upon the eye from below the horizon, particularly when downward gazing would increase the intensity of light passing through the pupil.

In this embodiment of the invention, it is also a feature of the lens 40 to include stabilizing means to substantially maintain the meridianal orientation of the lens 40 about the cornea of the eye of a wearer. Thus, during eye movement, the tinted zone 42 will remain substantially in a desired orientation. The stabilizing means may also comprise prism ballast formed in the lens, such as in the lower portion of the lens. The incorporation of prism ballast in known manners will substantially control lens rotation within normal limits. For example, $1.50^{\Delta}$ of prism ballast has been found to substantially maintain the meridianal orientation of the lens, so that the tinted portion of the lens does not rotate away from the visual axis.

Figures 16, 17:
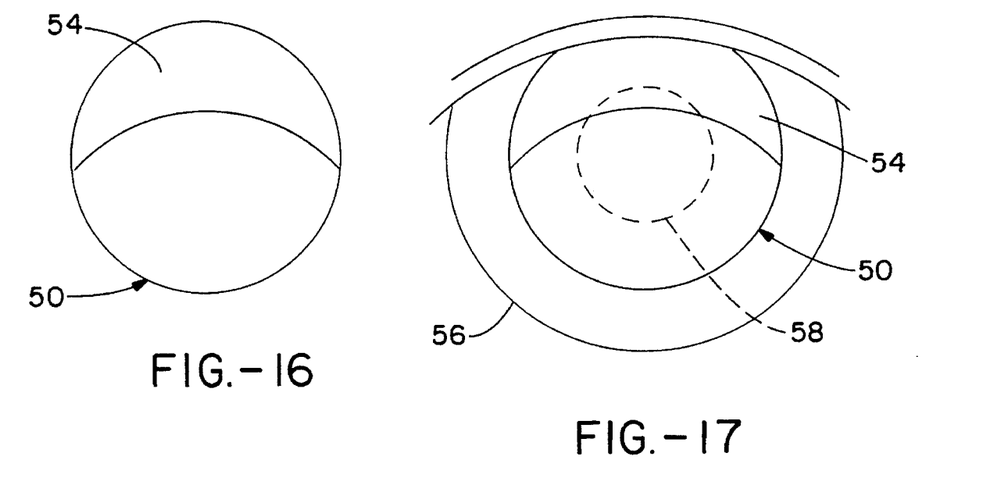
FIG. 16 shows a further embodiment of the contact lens according to the invention.
FIGS. 17 and 18 show translational movement of an embodiment of the contact lens relative to the cornea and pupil of the eye in accordance with one embodiment of the invention.

Another embodiment of a lens according to the invention is shown in FIG. 16, with the contact lens 50 includes an upper tinted zone 54 and translational means formed in the lens. In this embodiment, the translational means causes the lens to translate on the eye in a manner that the tinted portion 54 is moved toward the visual axis of the wearer. For example, a base down prism may be provided at an upper or lower portion of the lens to cause translational movement downward in an upward gaze. Again, the translational means may be provided to move the lens in a particular manner during particular eye movements such as upward or downward gaze, as well as relative nasal rotation of the eye. Translational movement of the lens will preferably translate the tinted portion of the lens toward the visual axis, but also could be provided to move the tinted region away from the visual axis if desired.

Figure 18:
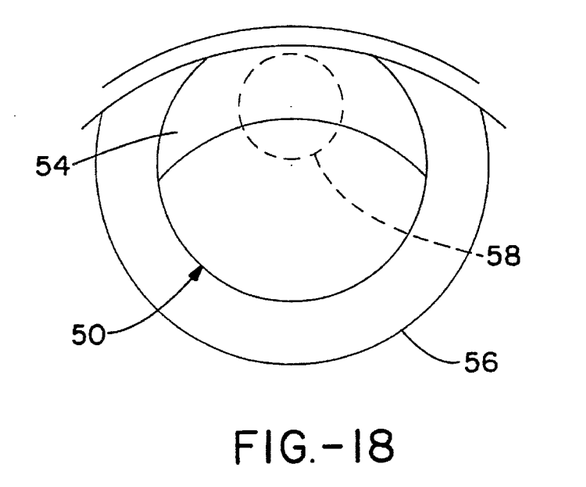

In FIGS. 17 and 18, translational movement of the lens 50 on the eye is shown. In this embodiment, lens 50 is normally centered on the cornea 56, with the visual axis centered with lens 50 as shown by pupil 58 during straight-ahead gazing. As shown in this embodiment, tinted region 54 of lens 50 may be provided to cover only a portion of the optical zone corresponding to pupil 58, or may be wholly outside of this region of the lens as desired. Thus, as the wearer gazes straight-ahead, the tinted portion of the lens will not substantially affect transmission of visible light through the pupil 58. The lens is then made to translate toward the visual axis upon movement. The translational means provides movement of the lens to bring the tinted region 54 toward pupil 58 as shown in FIG. 18. Thus, under high-intensity light conditions, wherein higher intensity light is incident upon the eye from above the horizon, transmittance of the light through the pupil may be modified according to the invention. Upon upward gazing, pupillary constriction with increasing intensity of light incident upon the eye will cause a dominant portion of light transmitted through the pupil to pass through the tinted region in a desired manner. Again, translational means in accordance with the invention may be provided in a variety of known manners, using prism ballast, truncation, a combination of these, causing the lens to move upwardly, downwardly, or in a predetermined manner relative to the cornea and the visual axis. Also, as in the previous embodiment, where a portion of the lens is tinted non-symmetrically, it may be necessary to provide stabilization means to maintain the meridianal orientation of the lens relative to the visual axis.

Figure 19:
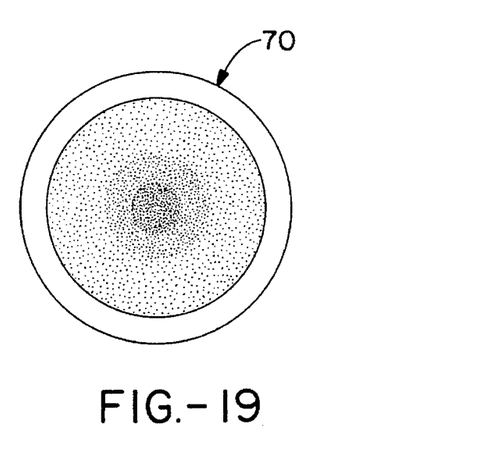
FIG. 19 shows a further embodiment of the invention.

In a further embodiment of a contact lens according to the invention, FIG. 19 shows a lens having a gradation of tint at predetermined region of the lens. More particularly, transmittance characteristics over the tinted portion of the lens vary continuously from a region of highest tint toward the area of lesser tint. As an example, the lens 70 shown in FIG. 19 has a central portion of the lens provided with a tint which will absorb a greater amount of visible light. Extending towards the periphery of the lens from the central portion, a continuous increase in transmittance of visible light will occur through the optical zone of the lens 70. A hard or soft contact lens 70 in accordance with this embodiment may be manufactured by centrifugal casting techniques, wherein, a tint according to the invention is applied at a central portion of the lens prior to centrifugal casting. During casting, the tinting agents will be dispersed toward the periphery of the lens 70 to create the gradation of tint according to this embodiment. Alternatively, the lens may be formed as a button, with the entire material of the button tinted uniformly in accordance with the invention. Thereafter, lathe cutting of the button will remove a portion of the material and the colorant, to mechanically produce the desired gradation of tint.

While this invention has been described with reference to preferred embodiments thereof, these are:by way of illustration and not limitation. Variations and modifications can be made by those skilled in the art without departing from the scope or spirit of this invention.

What is claimed is:

1. A tinted contact lens comprising:
   (a) a matrix polymer which is shaped to form a contact lens, at least a portion of which is tinted; and
   (b) a plurality of colorants for tinting said lens or a portion thereof;
      said colorants imparting to said lens or portion thereof (I) an essentially zero transmittance of radiation having wavelengths from 200 to about 500 nanometers, (ii) a variable and wavelength-dependent transmittance of radiation having wavelengths from about 550 to 700 nm wherein transmittance of radiation over a bandwidth of at least 50 nm in the range from 550 to 700 nm is less than 50%.

2. A lens according to claim 1, wherein, said matrix polymer is clear.

3. A lens according to claim 1, wherein, said matrix polymer and said lens are rigid.

4. A lens according to claim 3, wherein,
   said matrix polymer is polymethyl methacrylate or a methyl methacrylate co-polymer.

5. A lens according to claim 3, wherein,
   said plurality of colorants includes an ultraviolet light absorber and at least one additional colorant.

6. A lens according to claim 1, wherein,
   said lens is a soft contact lens and said matrix polymer is a hydrophilic polymer.

7. A lens according to claim 6, wherein,
   said plurality of colorants are reactive dyes and are chemically bonded to a surface of said lens.

8. A lens according to claim 6, wherein,
   a central portion of said lens is tinted and a peripheral portion of said lens is untinted.

9. A lens according to claim 1, wherein,
   said lens has an optical zone and said tinted portion of said lens extends over only a portion of said optical zone such that transmittance characteristics within said portion are varied.

10. A lens according to claim 9, wherein,
    the remaining portion of said optical zone is also tinted with at least an ultraviolet light absorber.

11. A lens according to claim 9, wherein,
    said tinted portion is provided at a center portion of said lens.

12. A lens according to claim 11, wherein,
    said center portion of said lens is a circular zone concentric with the center of the lens and having a diameter in the range of 1–5 mm, with the remaining portion of said optical zone extending concentrically about said center portion.

13. A lens as in claim 9, wherein,
    said lens is a soft contact lens having a diameter greater than the cornea of an eye sufficient to extend partially under both upper and lower eyelids, and having centration means to substantially maintain the position of said lens relative to the cornea of the eye of a wearer of said lens.

14. A lens according to claim 13, wherein,
    said centration means comprising the lens having an increased central thickness, wherein the eyelids of said wearer substantially maintain said position of said lens.

15. A lens according to claim 13, wherein,
    said centration means comprises a peripheral ballast formed in said lens to substantially maintain said position of said lens.

16. A lens according to claim 9, wherein
    said lens includes translational means causing said lens to move relative to the cornea of the eye of a wearer of said lens upon movement of the cornea, and wherein said tinted portion of said lens is translationally moved relative to the visual axis of the eye of a wearer of said lens.

17. A lens according to claim 16, wherein,
    said translational means comprises forming said contact lens having a truncated portion, wherein, the eyelid will impinge upon said truncated portion to facilitate translational movement of said lens.

18. A lens according to claim 16, wherein,
    said translational means comprises forming said contact lens with prism ballast over a portion of said lens, to facilitate translational movement of said lens.

19. A lens according to claim 16, wherein,
    said tinted portion of said lens is on an upper portion, and said translational means causes downward movement of said lens relative to said cornea and toward the visual axis.

20. A lens according to claim 16, wherein,
    said tinted portion of said lens is on a lower portion, and said translational means causes upward movement of said lens relative to said cornea and toward the visual axis.

21. A lens according to claim 9, wherein,
    said lens includes stabilizing means to substantially maintain the orientation of said lens about the cornea of the eye of a wearer of said lens.

22. A lens according to claim 21, wherein,
    said stabilizing means comprises truncation of a portion of said lens to substantially maintain the orientation of said lens relative to the visual axis.

23. A lens according to claim 21, wherein
    said stabilizing means comprises a prism ballast formed over a portion of said lens to substantially maintain the orientation of said lens relative to the visual axis.

24. A tinted lens comprising:
    (a) a transparent rigid matrix polymer which is shaped to form a contact lens or an intraocular lens, at least a portion of which is tinted; and (b) at least one colorant for tinting said lens or a portion thereof;

said at least one colorant imparting to said lens or portion thereof (I) an essentially zero transmittance of radiation having wavelengths from 200 to about 500 nanometers, (ii) a variable and wavelength-dependent transmittance of radiation having wavelengths from about 550 to 700 nm wherein transmittance of radiation over a banddwidth of at least 50 nm in the range from 550 to 700 nm is less than 50%.

25. A tinted soft contact lens comprising:

(a) a transparent hydrophilic matrix polymer which is shaped to form a contact lens or an intraocular lens, at least a portion of which is tinted; and (b) at least one colorant for tinting said lens or a portion thereof;

said at least one colorant imparting to said lens or portion thereof (I) an essentially zero transmittance of radiation having wavelengths from 200 to about 500 nanometers, (ii) a variable and wavelength-dependent transmittance of radiation having wavelengths from about 550 to 700 nm wherein transmittance of radiation over a bandwidth of at least 50 nm in the range from 550 to 700 nm is less than 50%.

26. The contact lens of claim 25, wherein, said lens provides at least 80% transmittance of radiation having wavelengths from 700 to 800 nm.

27. A tinted lens comprising:

(a) a matrix polymer which is shaped to form a contact lens or an intraocular lens, at least a portion of which is tinted; an (b) at least one colorant for tinting said lens or a portion thereof;

said at least one colorant imparting to said lens or portion thereof (i) an essentially zero transmittance of radiation having wavelengths from 200 to about 500 nanometers, (ii) a variable and wavelength-dependent transmittance of radiation having wavelengths from about 550 to 700 nm wherein transmittance of radiation over a bandwidth of at least 50 nm in the range from 550 to 700 nm is less than 40%.

28. A tinted lens comprising:

(a) a transparent rigid matrix polymer which is shaped to form a contact lens or an intraocular lens, at least a portion of which is tinted; and (b) at least one colorant for tinting said lens or a portion thereof; transmittance of radiation having wavelengths from 200 to about 500 nanometers, (ii) a variable and wavelength-dependent transmittance of radiation having wavelengths from about 550 to 700 nm wherein transmittance of radiation in the range from 550 to 700 nm is reduced over a portion of said range from a relatively higher value within said range.

* * * * *